(12) United States Patent
Kuo

(10) Patent No.: US 9,126,646 B2
(45) Date of Patent: Sep. 8, 2015

(54) LUMINOUS PEDAL STRUCTURE FOR A BICYCLE

(71) Applicant: Chao-Chiung Kuo, Yuanlin Township, Changhua County (TW)

(72) Inventor: Chao-Chiung Kuo, Yuanlin Township, Changhua County (TW)

(*) Notice: Subject to any disclaimer, the term of this patent is extended or adjusted under 35 U.S.C. 154(b) by 182 days.

(21) Appl. No.: 13/945,960

(22) Filed: Jul. 19, 2013

(65) Prior Publication Data

US 2015/0023033 A1 Jan. 22, 2015

(51) Int. Cl.
*B62J 6/00* (2006.01)
*B62M 3/08* (2006.01)

(52) U.S. Cl.
CPC .... *B62J 6/00* (2013.01); *B62M 3/08* (2013.01)

(58) Field of Classification Search
USPC .............. 362/192, 523, 524; 74/594.1, 594.4; 280/29, 200, 211
See application file for complete search history.

(56) References Cited

U.S. PATENT DOCUMENTS

| 6,550,945 | B2 * | 4/2003 | Chiu | 362/473 |
| 7,901,118 | B2 * | 3/2011 | Chia-Li et al. | 362/473 |
| 2002/0134192 | A1 * | 9/2002 | Chang | 74/594.4 |
| 2002/0152835 | A1 * | 10/2002 | Chang | 74/594.1 |

* cited by examiner

*Primary Examiner* — Nimeshkumar Patel
*Assistant Examiner* — Brenitra M Lee
(74) *Attorney, Agent, or Firm* — Alan D. Kamrath; Kamrath IP Lawfirm, P.A.

(57) ABSTRACT

A luminous pedal structure for a bicycle is mounted on a crank of a bicycle and contains a body, an electricity generating device, a shaft, and a covering member. Each limiting column of the electricity generating device fits with each magnetic element and inserts into each connecting post, and coils fit with limiting columns and contact with magnetic elements; the transmission set has a large chainring and plural small chainrings meshing with the large chainring meshes, the holders of the covering member connect with the limiting columns, the shaft and the limiting columns are rotated by picture bearings which rotate at different speeds and axes so as to drive the large chainring and the small chainrings to rotate, such that the magnetic elements are driven to rotate the coils so as to generate an induced voltage, by which the light-emitting elements generate a forward voltage to emit lights.

5 Claims, 9 Drawing Sheets

LUMINOUS PEDAL STRUCTURE FOR A BICYCLE

FIELD OF THE INVENTION

The present invention relates to a luminous pedal structure for a bicycle which is mounted on a crank of a bicycle.

BACKGROUND OF THE INVENTION

As shown in FIG. 9, a conventional luminous pedal is mounted on a screwing portion 61 of a crank 6 of a bicycle, and the crank 6 has a connecting portion 62 formed on one end thereof opposite to the screwing portion 61 so as to couple with a shaft 63. The luminous pedal 5 contains a post 51 for connecting with the crank 6, a base 52 fitted on the post 51, an electricity generating device 53 fixed between the post 51 and the base 52, a plurality of light emitting elements 56 driven by the electricity generating device 53, and a covering member 57 for covering the electricity generating device 53, a chamber 521 formed in the base 52, two slots 522 arranged on two sides of the base 52.

The electricity generating device 53 is defined between the post 51 and the base 52 and includes a magnetic element 54 fitted on the post 51, and a coil member 55 disposed in the chamber 521 of the base 52 and surrounding the magnetic element 54. When the coil member 55 rotates relative to the magnetic element 54, an induced voltage is outputted. The magnetic element 54 is a circularly permanent magnet, and the coil member 55 has a body 551 with guiding lines, a first electrode piece 552 and a second electrode piece 552' for outputting the induced voltage. The first electrode piece 552 and the second electrode piece 552' electrically connect with the plurality of light emitting elements 56. The coil member 55 also has a first pole portion 553 and a second pole portion 553', wherein the first pole portion 553 and the second pole portion 553'are formed in a triangle shape, spaced apart from each other, and biased against the body 551.

However, when a rider steps the luminous pedal slowly, the electricity generating device 53 cannot generate enough induced voltage, so the plurality of light emitting elements 56 cannot be driven by the induced voltage of the electricity generating device 53 to emit lights.

The present invention has arisen to mitigate and/or obviate the afore-described disadvantages.

SUMMARY OF THE INVENTION

The primary object of the present invention is to provide a luminous pedal structure for a bicycle which is capable of overcoming the shortcomings of the conventional luminous pedal structure.

To obtain the above objectives, a luminous pedal structure contains a luminous pedal mounted on a crank of a bicycle, and the luminous pedal contains: a body, an electricity generating device, a shaft, and a covering member.

The body includes a chamber defined on one end thereof so as to receive the electricity generating device, and the chamber has a first hole formed on a central portion thereof so as to insert a shaft, a plurality of hollow connecting posts surrounding the first hole of the chamber, plural second holes adjacent to an inner rim of the chamber, and two recesses defined in the chamber and corresponding to each other; the chamber also has two opposite slots formed on an outer rim thereof so as to receive two translucent plates.

The electricity generating device is fixed in the chamber of the body and includes: a plurality of limiting columns inserted into the plurality of hollow connecting posts; plural magnetic elements fitted on the plurality of limiting columns; an electricity conducting member fitted between the plurality of limiting columns and the plural magnetic elements. The electricity conducting member has a first conducting disc, a second conducting disc corresponding to the first corresponding disc, and a plurality of coils defined between the first conducting disc and the second conducting disc. Among connecting ends of the first conducting disc, the second conducting disc, and the plurality of coils are arranged plural first conduction portions, and any two first conduction portions are spaced apart from each other, between any two first conduction portions is defined a second conduction portion, each first conduction portion and the second conduction portion are biased against each coil, on two sides of an outer rim of a respective one of the first corresponding disc and the second conducting disc are provided two conductive terminals for electrically connecting with two IC control boards, and each IC control board has a plurality of light-emitting elements and is placed into each recess of the chamber of the body; a transmission set has a large chainring fitted on a front end of the shaft and has plural small chainrings fitted on front ends of the plurality of limiting columns.

The shaft is inserted through the orifice of the electricity generating device and the first hole of the body, and the shaft includes two screwing sections formed on a front end and a rear end of the shaft so as to screw with the crank of the bicycle and a first locking element, the shaft also includes a coupling extension for rotatably fitting with the body, a biasing surface for abutting against the body after the body fits with the coupling extension, a peripheral trench fitting with the large chainring of the transmission set, and a driving section driven by a tool.

The covering member is recessed and covered onto the body, the covering member includes: a first aperture defined on a central portion thereof for inserting the shaft; a plurality of holders surrounding around the aperture, plural second apertures formed proximate to an inner peripheral side of the covering member, and plural contacting protrusions extending outwardly from two sides of an inner wall of the covering member so as to contact with the electricity conducting member of the electricity generating device; and the covering member also includes two opposite insertions disposed on an outer peripheral side thereof and inserted into the two opposite slots of the body.

Each limiting column fits with each magnetic element and inserts into each hollow connecting post, and the plurality of coils fit with the plurality of limiting columns and contact with the plural magnetic elements; the transmission set of the electricity generating member has the large chainring fitted on the peripheral trench of the shaft and has the plural small chainrings fitted on the plurality of limiting columns, and the large chainring meshes with the plural small chainrings, and the plurality of holders of the covering member are applied to connect with the plurality of limiting columns, the shaft and the plurality of limiting columns are rotated by picture bearings which rotate at different speeds and axes so as to drive the large chainring and the plural small chainrings to rotate, such that the plural magnetic elements are driven to rotate the plurality of coils so as to generate an induced voltage, by which the plurality of light-emitting elements of each IC control board generate a forward voltage to emit lights stably.

Thereby, the luminous pedal structure of the present invention has the following advantages:

1. The shaft and the plurality of limiting columns of the electricity generating device are rotated by the picture bearings which rotate at different speeds and axes so as to drive the large chainring and the plural small chainrings to rotate, such that the plural magnetic elements are driven to rotate the plurality of coils so as to generate the induced voltage, by which the plurality of light-emitting elements of each IC control board generate the forward voltage to emit lights stably.

2. When a rider steps or stops stepping the luminous pedal, electricity stored in the capacitance accumulator is conducted to the discharging device, such that the plurality of light-emitting elements emit lights continuously.

3. When the rider steps the luminous pedal at a middle speed, the induced voltage is conducted to the plurality of light-emitting elements directly by means of the voltage stabilizer, thus emitting lights from the plurality of light-emitting elements.

4. When the rider steps the luminous pedal at a high speed or stops stepping the luminous pedal, the voltage stabilizer lowers a high induced voltage, and then the high induced voltage lowered is conducted to the plurality of light-emitting elements from each conductive terminals through the capacitance accumulator, each IC control boards, and the discharging device, thus preventing the high induced voltage from damaging each IC control board.

DETAILED DESCRIPTION OF THE PREFERRED EMBODIMENTS

Figure 1:
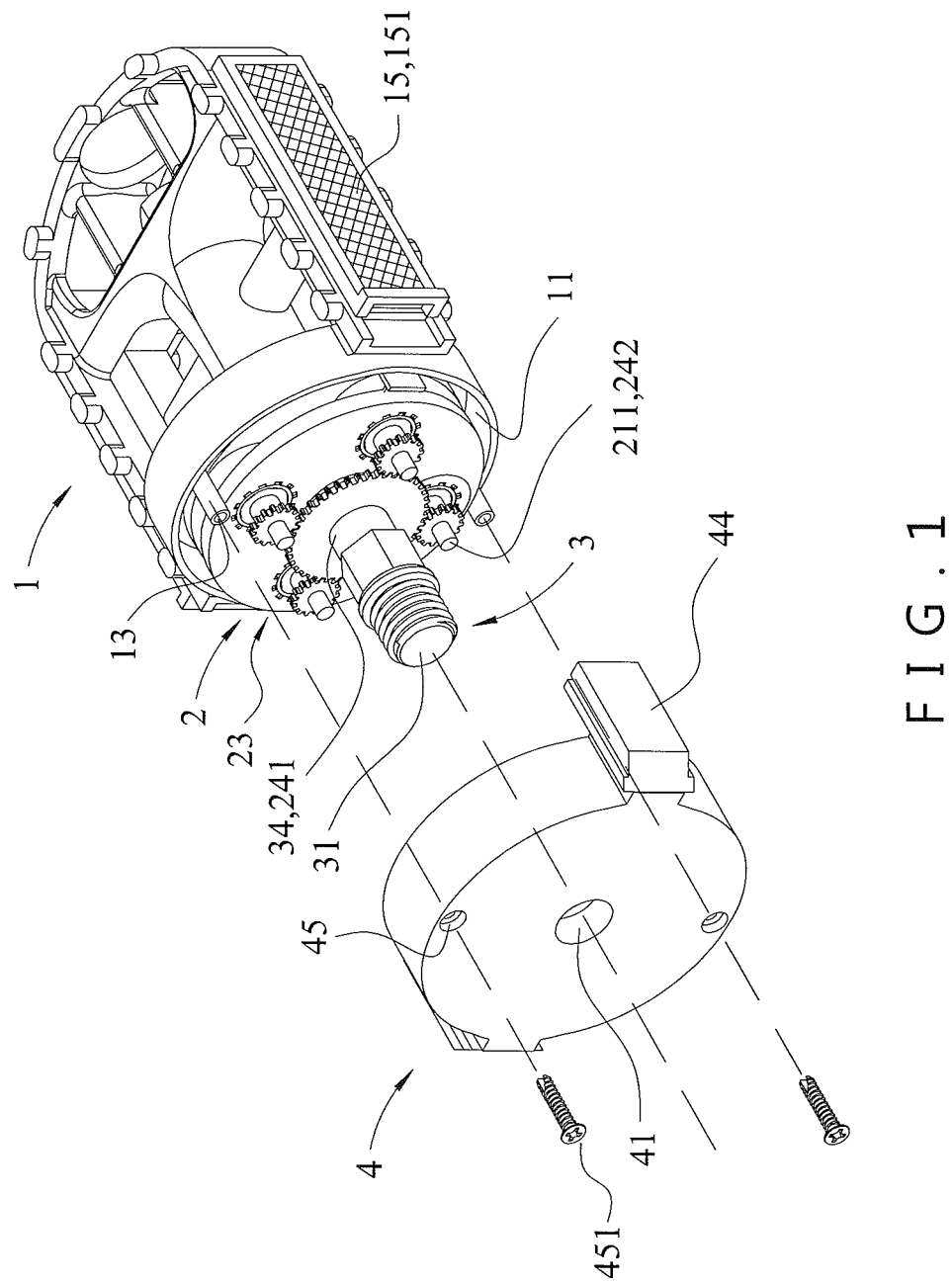
FIG. 1 is a perspective view showing a covering member being not covered onto a body of a luminous pedal structure for a bicycle according to a preferred embodiment of the present invention.
Figure 2:
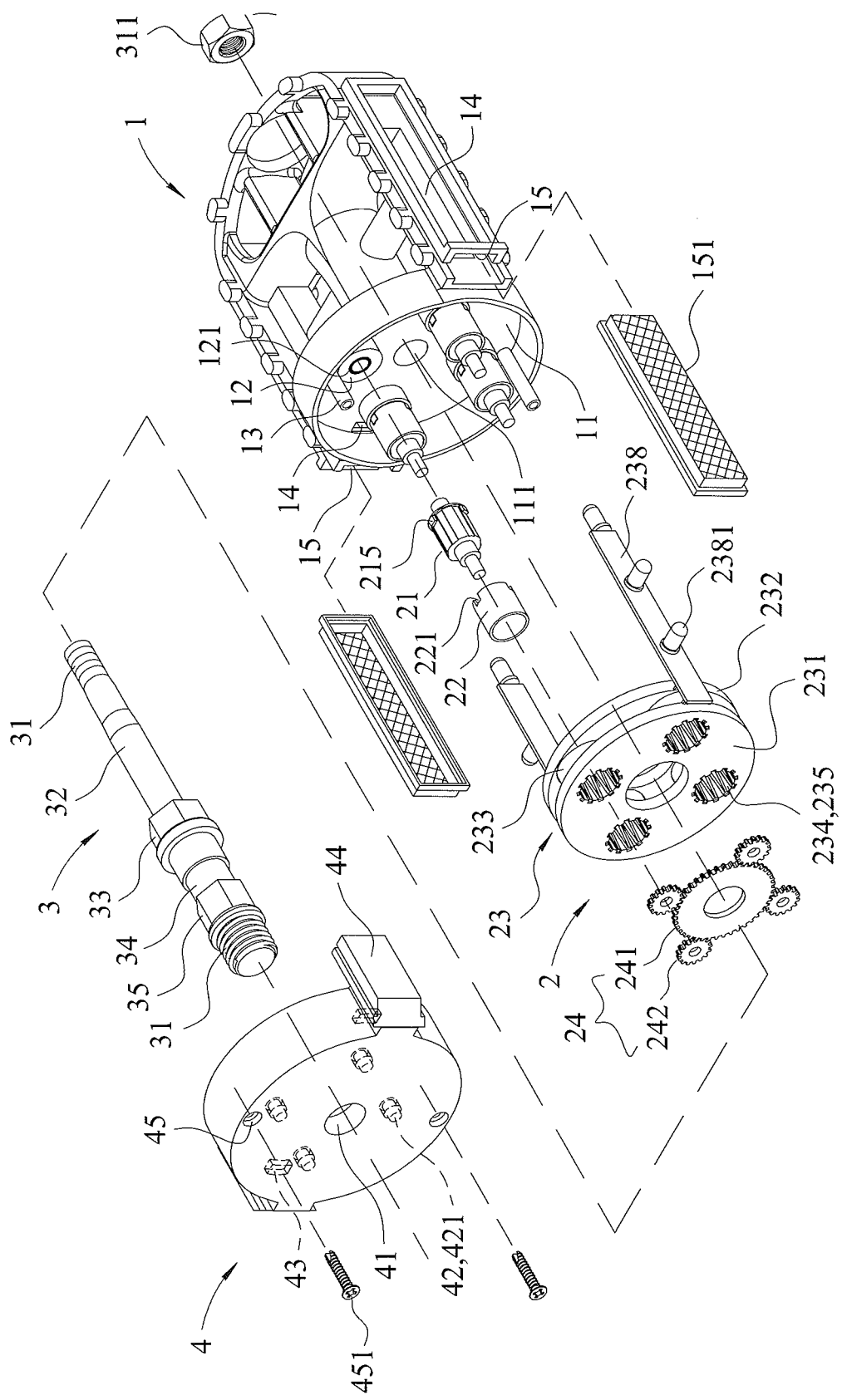
FIG. 2 is a perspective view showing the exploded components of the luminous pedal structure for the bicycle according to the preferred embodiment of the present invention.
Figure 3:
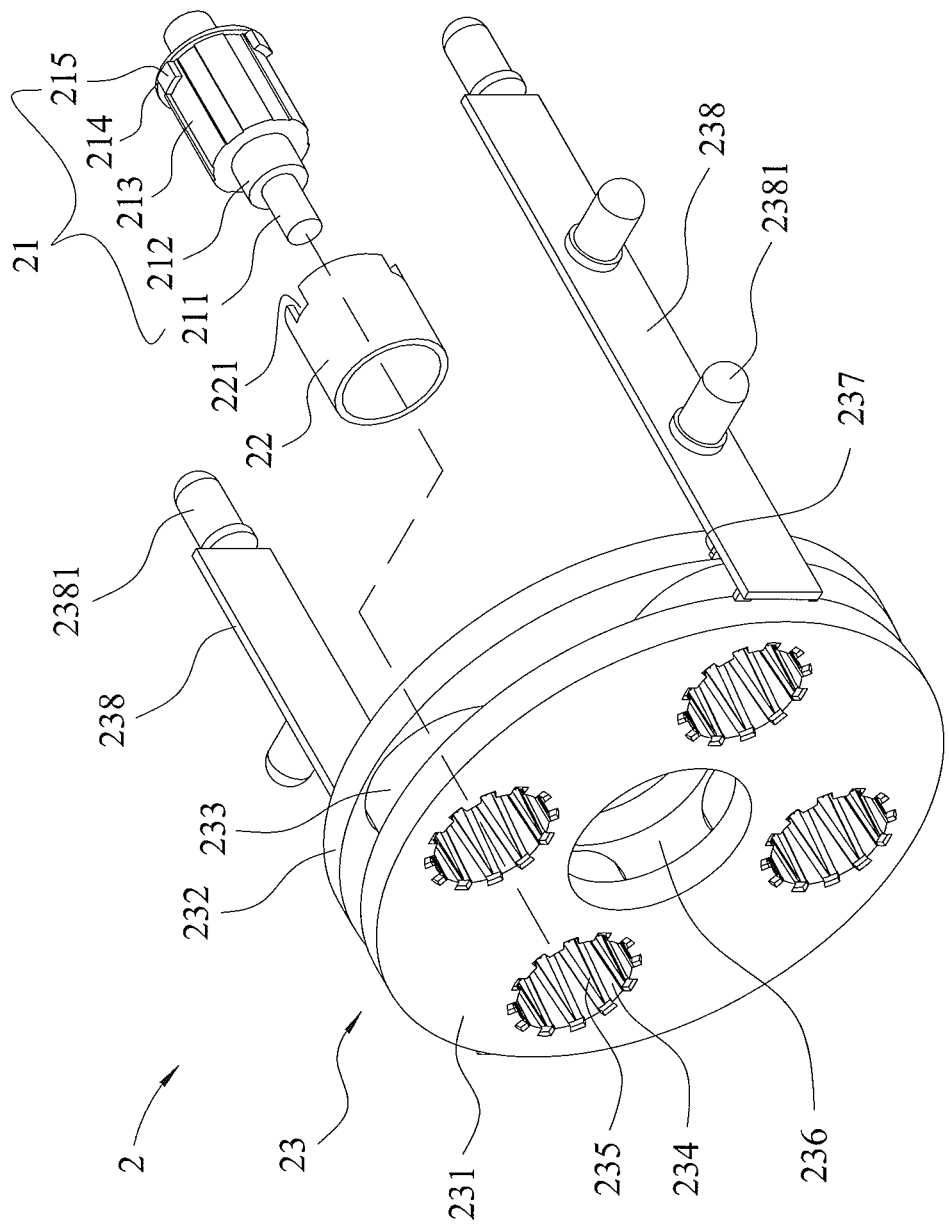
FIG. 3 is a perspective view showing the exploded components of an electricity generating device of the luminous pedal structure for the bicycle according to the preferred embodiment of the present invention.

With reference to FIGS. 1 and 3, a luminous pedal structure for a bicycle according to a preferred embodiment of the present invention is a luminous pedal mounted on a crank of a bicycle, and the luminous pedal comprises: a body 1, an electricity generating device 2, a shaft 3, and a covering member 4.

The body 1 includes a chamber 11 defined on one end thereof so as to receive the electricity generating device 2, and the chamber 11 has a first hole 111 formed on a central portion thereof so as to insert the shaft 3, a plurality of hollow connecting posts 12 surrounding the first hole 111 of the chamber 11, plural second holes 13 adjacent to an inner rim of the chamber 11, and two recesses 14 defined in the chamber 11 and corresponding to each other; wherein each connecting post 12 has a first insulation layer 121 formed therein and made of a metal material; the chamber 11 also has two opposite slots 15 formed on an outer rim thereof so as to receive two translucent plates 151.

The electricity generating device 2 is fixed in the chamber 11 of the body 1 and includes: a plurality of limiting columns 21 inserted into the plurality of hollow connecting posts 12; plural magnetic elements 22 fitted on the plurality of limiting columns 21; an electricity conducting member 23 fitted between the plurality of limiting columns 21 and the plural magnetic elements 22. The electricity conducting member 23 has a first conducting disc 231, a second conducting disc 232 corresponding to the first corresponding disc 231, and a plurality of coils 233 defined between the first conducting disc 231 and the second conducting disc 232; among connecting ends of the first conducting disc 231, the second conducting disc 232, and the plurality of coils 233 are arranged plural first conduction portions 234, and any two first conduction portions 234 are spaced apart from each other, between any two first conduction portions 234 is defined a second conduction portion 235, wherein each first conduction portion 234 and the second conduction portion 235 are biased against each coil 233, and the plurality of coils 233 are fitted on the plurality of limiting columns 21 and contact with the plural magnetic elements 22, such that when the plurality of coils 233 rotate relative to the plural magnetic elements 22, an outputted sine wave voltage is sensed, on two sides of an outer rim of a respective one of the first corresponding disc 231 and the second conducting disc 232 are provided two conductive terminals 237 for electrically connecting with two IC control boards 238, and each IC control board 238 has a plurality of light-emitting elements 2381 and is placed into each recess 14 of the chamber 11 of the body 1; a transmission set 24 has a large chainring 241 fitted on a front end of the shaft 3 and has plural small chainrings 242 fitted on front ends of the plurality of limiting columns 21; wherein each limiting column 21 of the electricity generating device 2 has a peg 211 pivoted with each connecting post 12, an abutting periphery 212 for abutting against each small chainring 242 of the transmission set 24, an external fence 213 fitting with each magnetic element 22, a circular tab 214 coupling with one end of the external fence 213, and a plurality of defining blocks 215 arranged on a connecting portion of the external fence 213 and the circular tab 214; wherein each magnetic element 22 has plural cutouts 221 for retaining with the plurality of defining blocks 215 of each limiting column 21, and a size of each cutout 221 is larger than that of each defining block 215; wherein a respective one of the first conducting disc 231 and the second conducting disc 232 has an orifice 236 for inserting the shaft 3.

The shaft 3 is inserted through the orifice 236 of the electricity generating device 2 and the first hole 111 of the body 1 and includes two screwing sections 31 formed on a front end and a rear end of the shaft 3 so as to screw with the crank of the bicycle and a first locking element 311, wherein the shaft 3 also includes a coupling extension 32 for rotatably fitting with the body 1, a biasing surface 33 for abutting against the body 1 after the body 1 fits with the coupling extension 32, a peripheral trench 34 fitting with a large chainring 241 of the transmission set 24, and a driving section 35 driven by a tool.

The covering member 4 is recessed and covered onto the body 1, the covering member 4 includes: a first aperture 41 defined on a central portion thereof for inserting the shaft 3; a plurality of holders 42 surrounding around the aperture 41, plural second apertures 45 formed proximate to an inner peripheral side of the covering member 4, and plural contacting protrusions 43 extending outwardly from two sides of an inner wall of the covering member 4 so as to contact with the electricity conducting member 23 of the electricity generating device 2; and the covering member 4 also includes two opposite insertions 44 disposed on an outer peripheral side thereof and inserted into the two opposite slots 15 of the body 1, the covering member 4 is locked with the body 1 by ways of plural second locking elements 451; wherein each holder 42 has a second insulation layer 421 formed therein and made of a metal material.

Figure 4:
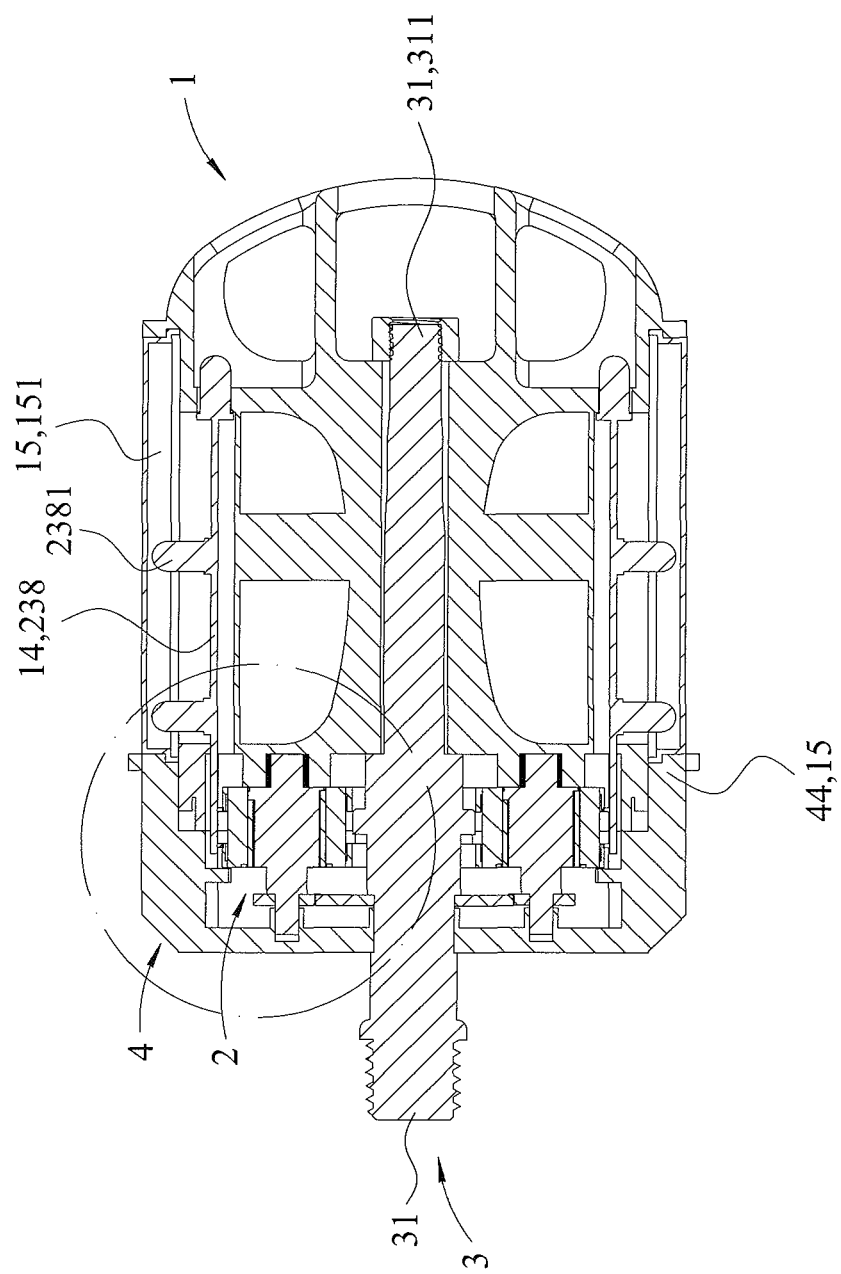
FIG. 4 is a cross sectional view showing the assembly of the luminous pedal structure for the bicycle according to the preferred embodiment of the present invention.
Figure 5:
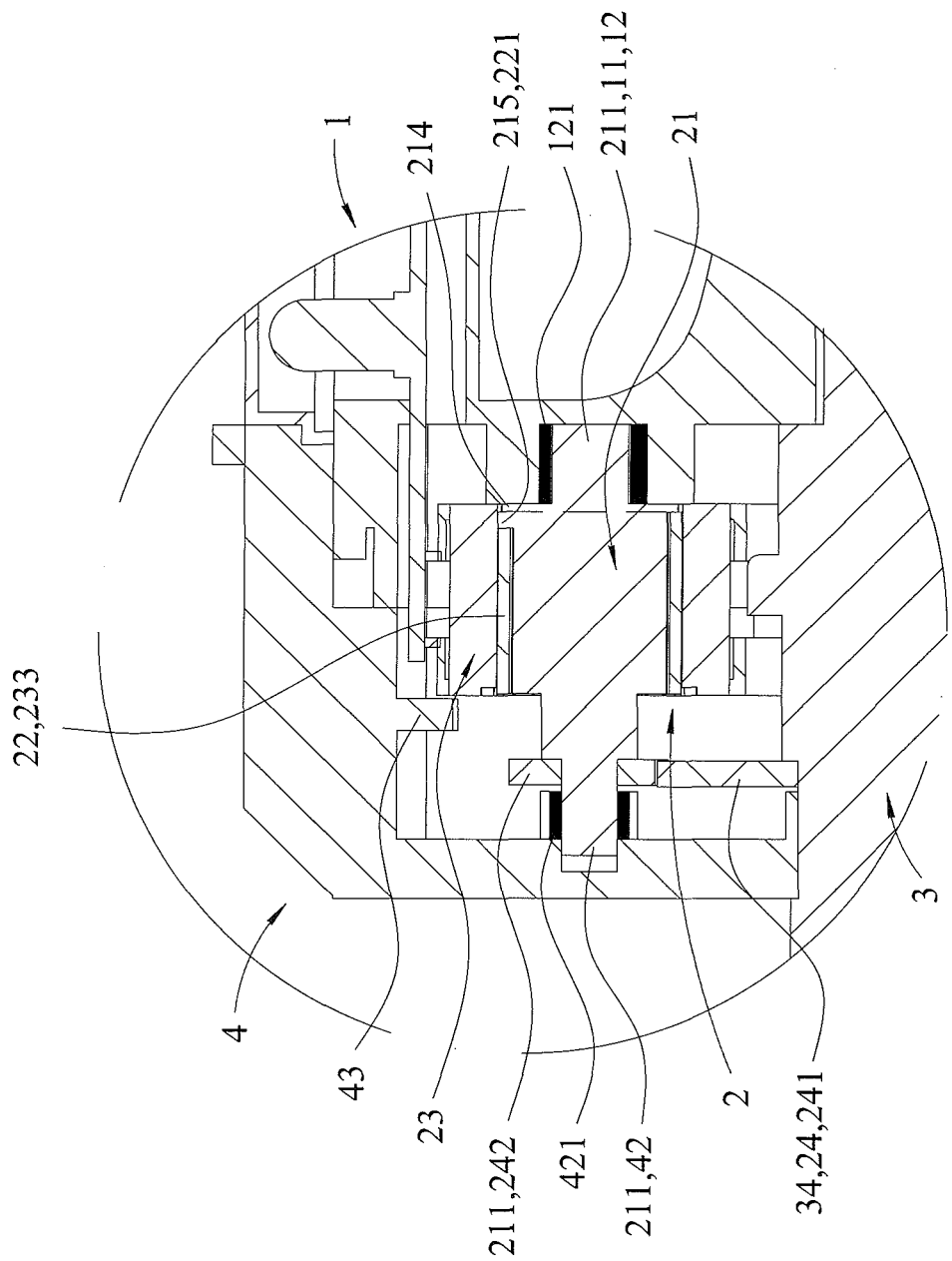
FIG. 5 is an amplified cross sectional view showing a part of FIG. 4.

Referring further to FIGS. 4 and 5, the luminous pedal comprises: the body 1, the electricity generating device 2 fixed in the chamber 11 of the body 1, the shaft 3 inserted through the electricity generating device 2 and the body 1, a screwing section 31 of the front end of the shaft 3 screws with the crank of the bicycle, and a screwing section 31 of the rear end of the shaft 3 screws with the first locking element 311 so as to fix the body 1, the covering member 4 is covered onto the body 1; wherein the chamber 11 of the body 1 is used to receive the electricity generating device 2, and the plurality of limiting columns 21 of the electricity generating device 2 are fitted with the plural magnetic elements 22 of the electricity generating device 2, wherein the plural cutouts 221 of each magnetic element 22 retain with the plurality of defining blocks 215 of each limiting column 21 and abut against the circular tab 214 of each limiting column 21; the peg 211 of each limiting column 21 is pivoted with each connecting post 12 of the chamber 11 of the body 1; wherein the plurality of hollow connecting posts 12 of the chamber 11 correspond to the plurality of holders 42 of the covering member 4; and each connecting post 12 has the first insulation layer 121 made of the metal material, each holder 42 has the second insulation layer 421 made of the metal material; wherein the plural contacting protrusions 43 extend outwardly from the two sides of the inner wall of the covering member 4 so as to contact with the electricity conducting member 23 of the electricity generating device 2; the plurality of coils 233 of the electricity conducting member 23 are fitted on the plurality of limiting columns 21 and contact with the plural magnetic elements 22; the transmission set 24 of the electricity generating member 2 has the large chainring 241 fitted on the peripheral trench 34 of the shaft 3 and has the plural small chainrings 242 fitted on pegs 211 of the plurality of limiting columns 21, and the large chainring 241 meshes with the plural small chainrings 242. It is to be noted that a transmission belt can be defined between the large chainring 241 and the plural small chainrings 242 of the transmission set 24 so as to rotate the large chainring 241 and the plural small chainrings 242, and the plurality of holders 42 of the covering member 4 are applied to connect with the pegs 211 of the plurality of limiting columns 21, the two opposite insertions 44 of the covering member 4 are inserted into the two opposite slots 15 of the body 1, and the shaft 3 and the plurality of limiting columns 21 are rotated by picture bearings which rotate at different speeds and axes so as to drive the large chainring 241 and the plural small chainrings 242 to rotate, such that the plural magnetic elements 22 are driven to rotate the plurality of coils 233 so as to generate an induced voltage, by which the plurality of light-emitting elements 2381 of each IC control board 238 generate a forward voltage to emit lights stably.

Figure 6:
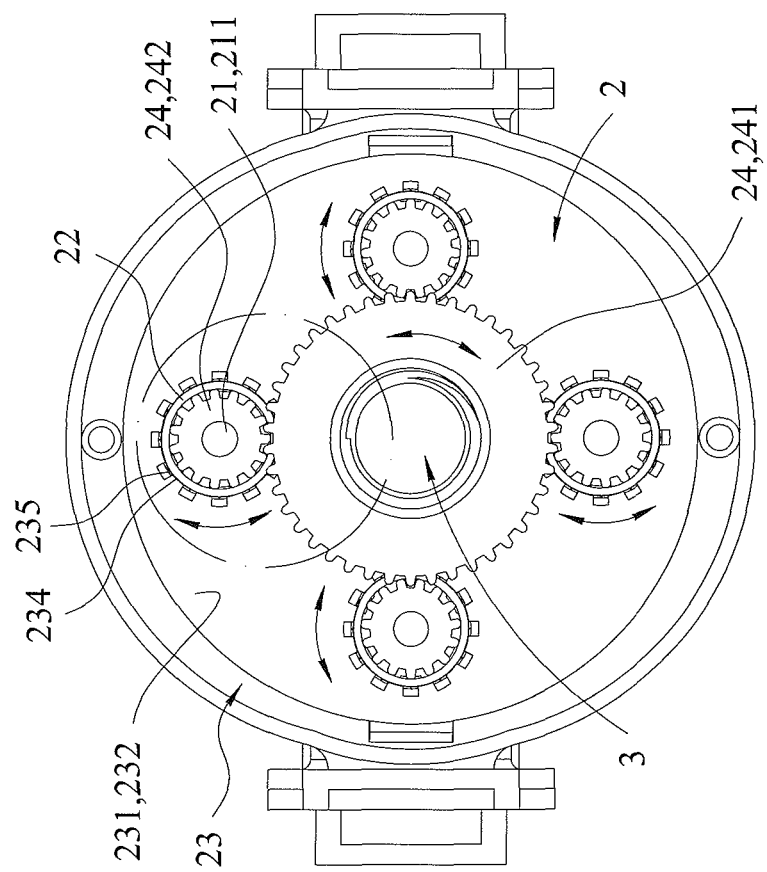
FIG. 6 is a plan view showing the operation of a transmission set of the luminous pedal structure for the bicycle according to the preferred embodiment of the present invention.
Figure 7:
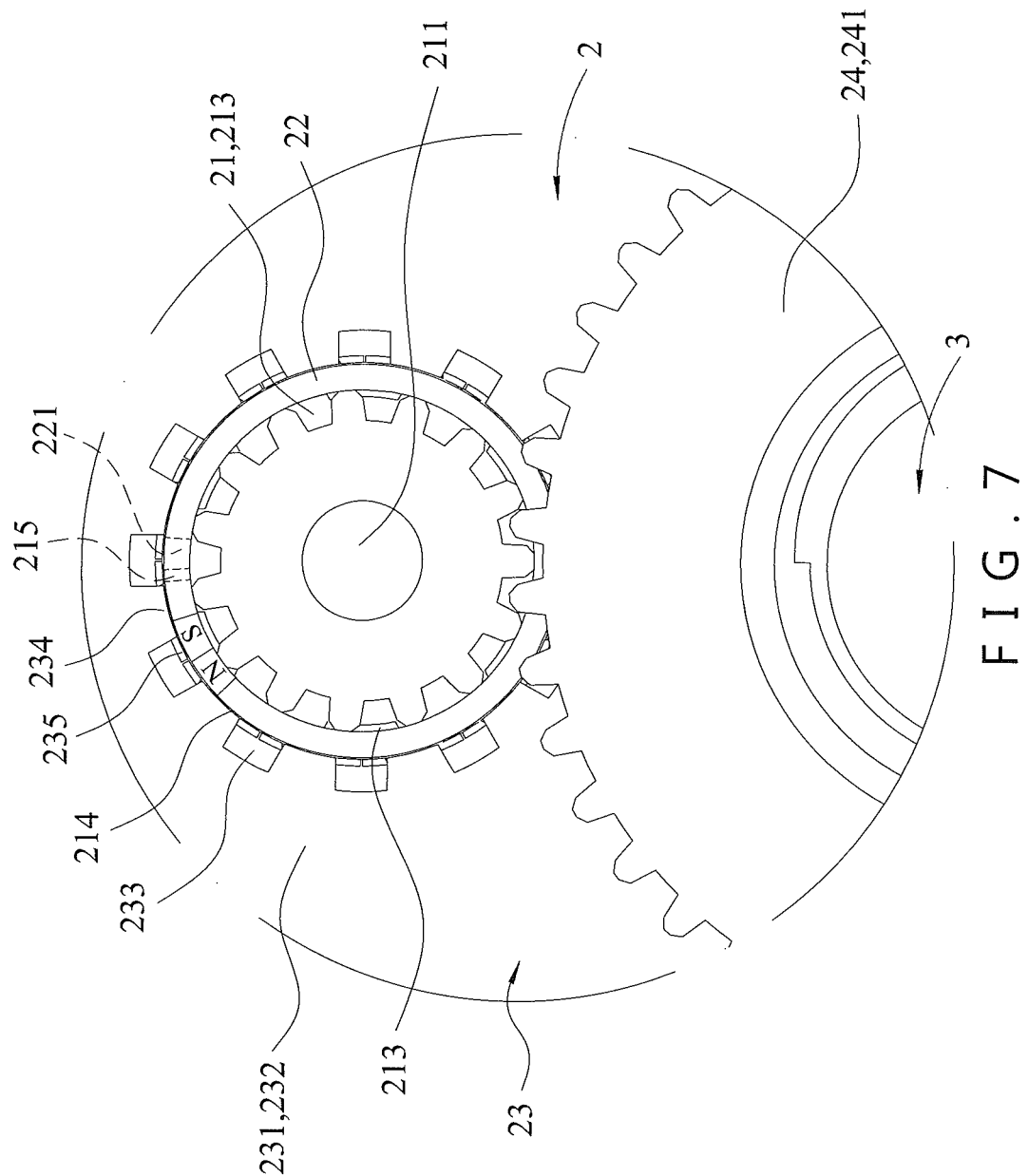
FIG. 7 is an amplified plan view showing a part of FIG. 6.

As shown in FIGS. 6 and 7, the external fence 213 of each limiting column 21 fits with each magnetic element 22, and each plural magnetic element 22 is a circularly permanent magnet which has a plurality of N poles and S poles. As illustrated in FIG. 7, only a N pole and a S pole are marked so as to simplified the FIG. 7, wherein the plural cutouts 221 retain with the plurality of defining blocks 215 of each limiting column 21 and abut against the circular tab 214 of each limiting column 21, and the plurality of defining blocks 215 of each limiting column 21 rotate in the plural cutouts 221 of each magnetic element 22; the electricity conducting member 23 has: the first conducting disc 231, the second conducting disc 232 corresponding to the first corresponding disc 231, and the plurality of coils 233 defined between the first conducting disc 231 and the second conducting disc 232; among the connecting ends of the first conducting disc 231, the second conducting disc 232, and the plurality of coils 233 are arranged the plural first conduction portions 234 formed in a triangular-sheet shape, and any two first conduction portions 234 are spaced apart from each other, between any two first conduction portions 234 is defined the second conduction portion 235, and each first conduction portion 234 and the second conduction portion 235 are biased against each coil 233, the large chainring 241 of the transmission set 24 is fitted on the front end of the shaft 3, and the plural small chainrings 242 are fitted on the front ends of the plurality of limiting columns 21, such that the shaft 3 and the plurality of limiting columns 21 are rotated by the picture bearings which rotate at different speeds and axes so as to drive the large chainring 241 and the plural small chainrings 242 to rotate, such that the plural magnetic elements 22 are driven to rotate the plurality of coils 233 so as to generate the induced voltage.

Figure 8:
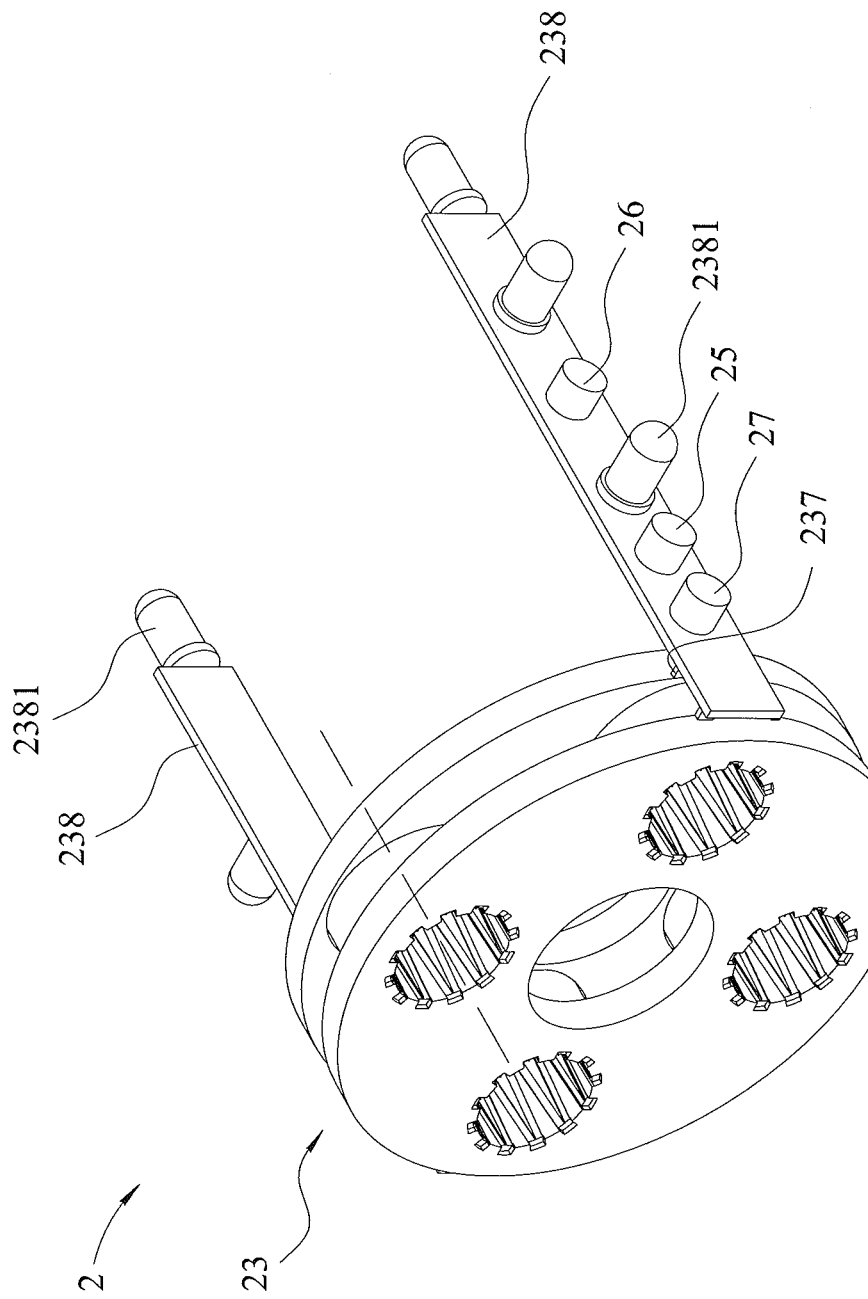
FIG. 8 is a perspective view showing the assembly of the electricity generating device of the luminous pedal structure for the bicycle according to the preferred embodiment of the present invention.
Figure 9:
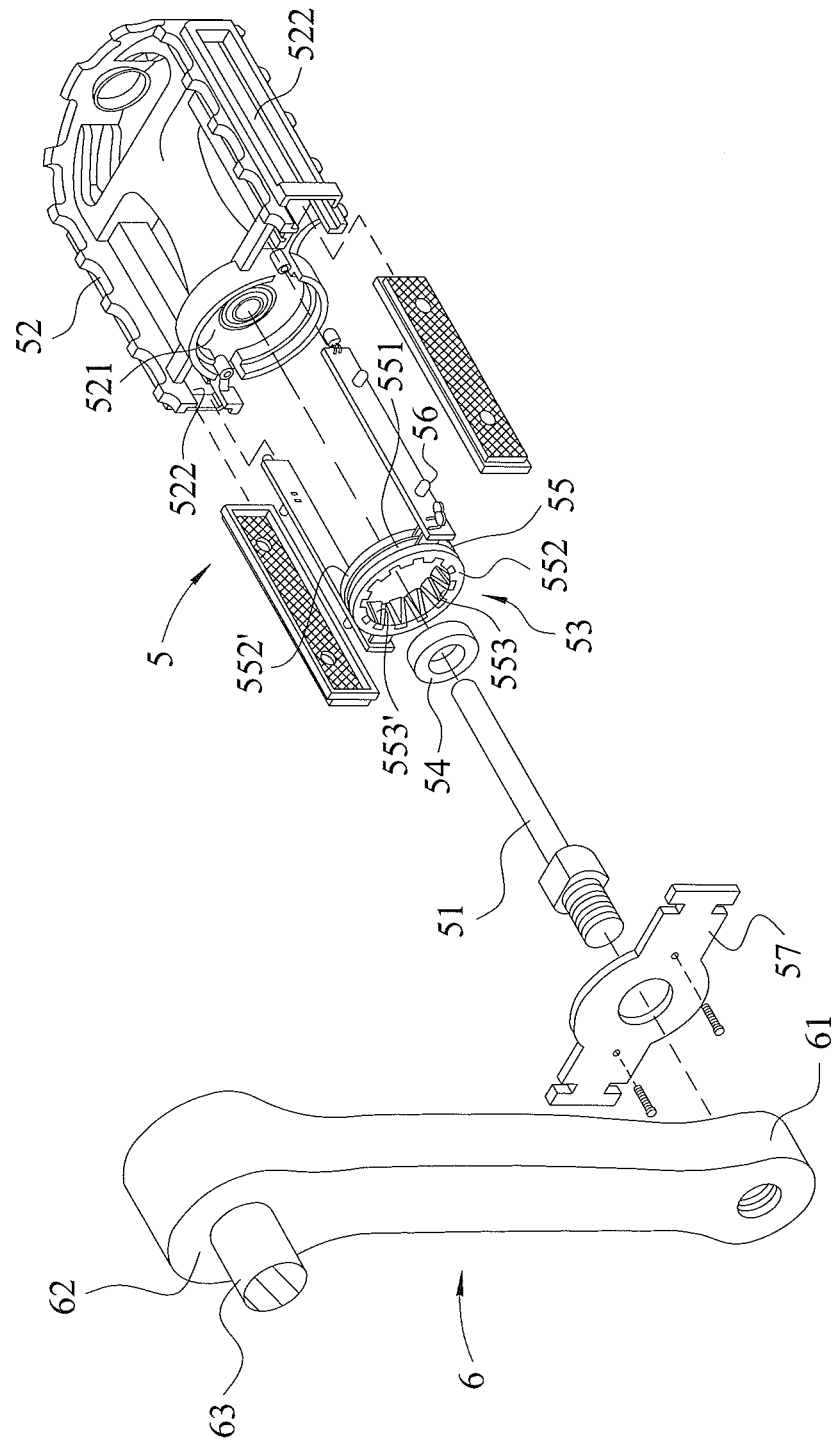
FIG. 9 is a perspective view showing the exploded components of a conventional pedal mounted on a crank of a bicycle.

In addition, between each conductive terminal 237 and each IC control board 238 are fixed a capacitance accumulator 25 and a discharging device 26, and the induced voltage generating from the electricity conducting member 23 of the electricity generating device 2 is conducted to the plurality of light-emitting elements 2381 from each conductive terminals 237 via the capacitance accumulator 25, each IC control board 238, and the discharging device 26 so as to emit lights when the bicycle runs slowly or stops running. Referring to FIG. 8, each IC control board 238 has a voltage stabilizer 27 mounted thereon adjacent to each conductive terminal 237, and the induced voltage generating from the electricity conducting member 23 of the electricity generating device 2 is conducted to the plurality of light-emitting elements 2381 from each conductive terminal 237 via the voltage stabilizer 27, the capacitance accumulator 25, each IC control board 238, and the discharging device 26 so as to prevent high induced voltage from damaging each IC control board 238.

Thereby, the luminous pedal structure of the present invention has the following advantages:

1. The shaft 3 and the plurality of limiting columns 21 of the electricity generating device 2 are rotated by the picture bearings which rotate at different speeds and axes so as to drive the large chainring 241 and the plural small chainrings 242 to rotate, such that the plural magnetic elements 22 are driven to rotate the plurality of coils 233 so as to generate the induced voltage, by which the plurality of light-emitting elements 2381 of each IC control board 238 generate the forward voltage to emit lights stably.

2. When a rider steps or stops stepping the luminous pedal, electricity stored in the capacitance accumulator 25 is conducted to the discharging device 26, such that the plurality of light-emitting elements 2381 emit lights continuously.

3. When the rider steps the luminous pedal at a middle speed, the induced voltage is conducted to the plurality of light-emitting elements 2381 directly by means of the voltage stabilizer 27, thus emitting lights from the plurality of light-emitting elements 2381.

4. When the rider steps the luminous pedal at a high speed or stops stepping the luminous pedal, the voltage stabilizer 27 lowers a high induced voltage, and then the high induced voltage lowered is conducted to the plurality of light-emitting elements from each conductive terminals 237 through the capacitance accumulator 25, each IC control boards 238, and the discharging device 26, thus preventing the high induced voltage from damaging each IC control board 238.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A luminous pedal structure for a bicycle being a luminous pedal mounted on a crank of a bicycle, and the luminous pedal comprising:

a body including a chamber defined on one end thereof, and the chamber having a first hole formed on a central portion thereof to insert a shaft, a plurality of hollow connecting posts surrounding around the first hole of the chamber, plural second holes adjacent to an inner rim of the chamber, and two recesses defined in the chamber and corresponding to each other; the chamber also having two opposite slots formed on an outer rim thereof to receive two translucent plates;

an electricity generating device fixed in the chamber of the body and including: a plurality of limiting columns inserted into the plurality of hollow connecting posts; plural magnetic elements fitted on the plurality of limiting columns; an electricity conducting member fitted among the plurality of limiting columns and the plural magnetic elements; the electricity conducting member having a first conducting disc, a second conducting disc corresponding to the first corresponding disc, and a plurality of coils defined between the first conducting disc and the second conducting disc; among connecting ends of the first conducting disc, the second conducting disc, and the plurality of coils being arranged plural first conduction portions, and any two first conduction portions being spaced apart from each other, between any two first conduction portions being defined a second conduction portion, each first conduction portion and the second conduction portion being biased against each coil, on two sides of an outer rim of a respective one of the first corresponding disc and the second conducting disc being provided two conductive terminals for electrically connecting with two IC control boards, and each IC control board having a plurality of light-emitting elements and being placed into each recess of the chamber of the body; a transmission set having a large chainring fitted on a front end of the shaft and having plural small chainrings fitted on front ends of the plurality of limiting columns;

the shaft being inserted through an orifice of the electricity generating device and the first hole of the body, and the shaft including two screwing sections formed on a front end and a rear end of the shaft so as to screw with the crank of the bicycle and a first locking element, the shaft also including a coupling extension for rotatably fitting with the body, a biasing surface for abutting against the body after the body fits with the coupling extension, a peripheral trench fitting with the large chainring of the transmission set, and a driving section driven by a tool; and a covering member being recessed and covered onto the body, the covering member including: a first aperture defined on a central portion thereof for inserting the shaft; a plurality of holders surrounding around the aperture, plural second apertures formed proximate to an inner peripheral side of the covering member, and plural contacting protrusions extending outwardly from two sides of an inner wall of the covering member so as to contact with the electricity conducting member of the electricity generating device; and the covering member also including two opposite insertions disposed on an outer peripheral side thereof and inserted into the two opposite slots of the body; wherein each limiting column fits with each magnetic element and inserts into each hollow connecting post, and the plurality of coils fit with the plurality of limiting columns and contact with the plural magnetic elements; the transmission set of the electricity generating member has the large chainring fitted on the peripheral trench of the shaft and has the plural small chainrings fitted on the plurality of limiting columns, and the large chainring meshes with the plural small chainrings, the plurality of holders of the covering member connect with the plurality of limiting columns, the shaft and the plurality of limiting columns are rotated by picture bearings which rotate at different speeds and axes so as to drive the large chainring and the plural small chainrings to rotate, such that the plural magnetic elements are driven to rotate the plurality of coils so as to generate an induced voltage, by which the plurality of light-emitting elements of each IC control board generate a forward voltage to emit lights stably.

2. The luminous pedal for the bicycle as claimed in claim 1, wherein each limiting column of the electricity generating device has a peg pivoted with each connecting post, an abutting periphery for abutting against each small chainring of the transmission set, an external fence fitting with each magnetic element, a circular tab coupling with one end of the external fence, and a plurality of defining blocks arranged on a connecting portion of the external fence and the circular tab.

3. The luminous pedal for the bicycle as claimed in claim 1, wherein between each conductive terminal and each IC control board are fixed a capacitance accumulator and a discharging device.

4. The luminous pedal for the bicycle as claimed in claim 3, wherein the induced voltage generates from the electricity conducting member of the electricity generating device and is conducted to the plurality of light-emitting elements from each conductive terminals via the capacitance accumulator, each IC control board, and the discharging device.

5. The luminous pedal for the bicycle as claimed in claim 3, wherein each IC control board has a voltage stabilizer mounted thereon adjacent to each conductive terminal, and the induced voltage generating from the electricity conducting member is conducted to the plurality of light-emitting elements from each conductive terminal via the voltage stabilizer, the capacitance accumulator, each IC control board, and the discharging device.

* * * * *